United States Patent [19]

Chang

[11] 4,192,074

[45] Mar. 11, 1980

[54] ON THE FLY RUN-OUT CORRECTION FOR VEHICLE ALIGNMENT

[75] Inventor: Andrew K. Chang, Malibu, Calif.

[73] Assignee: FMC Corporation, San Jose, Calif.

[21] Appl. No.: 863,196

[22] Filed: Dec. 22, 1977

[51] Int. Cl.$^2$ ............... G01B 19/295; G01B 19/575
[52] U.S. Cl. ......................................... 33/228; 33/288;
33/301; 33/336; 33/203.15; 33/203.18
[58] Field of Search ........... 33/203.12, 203.13, 203.14,
33/203.15, 203.16, 203.17, 203.18, 203.19,
203.20, 203.21, 203, 288, 335, 336, 337, 228,
301; 356/155

[56] References Cited

U.S. PATENT DOCUMENTS

| 3,445,936 | 5/1969 | Wilkerson | 33/288 |
| 3,892,042 | 7/1975 | Senften | 33/301 |
| 4,099,333 | 7/1978 | Forster | 33/203.12 |

FOREIGN PATENT DOCUMENTS

2358313  5/1975  Fed. Rep. of Germany ........ 33/203.18

Primary Examiner—John W. Shepperd
Attorney, Agent, or Firm—R. S. Kelly

[57] ABSTRACT

In a wheel alignment system, the error caused by run-out of the axis of a fixture that is clamped to the wheel and mounts gravity stabilized inclination sensors is corrected by continuously providing fixture axis inclination signals during rotation of the wheel through at least 360° from any random starting position. Maximum and minimum comparator devices continuously receive these signals. A first adder adds the maximum and minimum signals and divides them by 2 to provide a preliminary alignment signal proportional to the actual angular inclination of the wheel axis in a selected alignment plane, and the preliminary alignment signal is subtracted from an intermediate inclination signal from the sensor that represents the inclination of the fixture axis at the wheel stopped position to provide a run-out error signal proportional to that portion of the total angular run-out of the fixture axis that is present in a selected alignment plane at the wheel stopped position. When the wheel is set down, a final inclination signal is received from the sensor means and the run-out error signal is subtracted therefrom to provide an inclination signal that represents the true wheel axis inclination in a selected alignment plane corrected for run-out error, and this signal is displayed for wheel alignment purposes. The sensors measure run-out errors in both the camber and toe planes and provide separate displays for the alignment in both planes.

14 Claims, 10 Drawing Figures

FIG_6

FIG_7

ON THE FLY RUN-OUT CORRECTION FOR VEHICLE ALIGNMENT

BACKGROUND OF THE INVENTION

1. Field of the Invention

This invention relates to wheel alignment measurement and more specifically to the alignment of steerable vehicle wheels which are positioned at certain angular relationships known as toe and camber.

2. Description of the Prior Art

The procedure to which this invention relates is one wherein the front, or steerable, wheels of a vehicle have mounted thereon a fixture, or clamp, for use in the alignment measurement procedure. The fixture commonly employed is clamped to the rim of the wheel by means of clamps mounted on opposite ends of a cross bar structure. Adjustably mounted on the cross bar structure is a slide, which can be considered to correspond to the hub of the wheel. In the embodiment of the fixture disclosed herein, the slide has a stub shaft projecting therefrom which theoretically represents an extension of the wheel spindle. Pivotally mounted on the stub shaft is a counterweighted support or bracket, which serves the purpose of mounting angle measuring instruments, including sensors or detectors for providing information as to the inclination of the wheel axis of rotation in the horizontal plane (toe) and in the vertical plane (camber). Of course, the plane of rotation of the wheel is 90° to the axis of rotation of the wheel.

In the fixture shown herein, sensors are supported on a bracket that is pendulously mounted on the aforesaid stub shaft of the slide so that if the wheel is jacked up to clear the ground and rotated, the sensor support bracket does not rotate with the wheel. Of course, a reversed pendulous mounting structure could be provided wherein the sensor bracket has a stub shaft that is rotatably fitted into a socket in the slide, or simulated hub of the fixture.

Ideally, the aforesaid stub shaft of the fixture, or its equivalent, should be parallel to the axis of rotation of the wheel, which corresponds to the spindle axis. Under these ideal conditions, the angular disposition of the stub shaft or sensor mounting means does not change in either the vertical or the horizontal plane when the wheel is rotated. Thus, the inclination angles measured in the vertical and horizontal planes would be the true measurements of the inclination of the wheel rotational axis in those planes. However, if the axis of the stub shaft is inclined from the axis of wheel rotation (the spindle axis) and hence is not perpendicular to the plane of rotation of the wheel, a condition known as "run-out" is presented. Run-out causes the sensor stub-shaft axis to gyrate as the generatrix of a cone and thus produces an angular inclination of the stubshaft axis with respect to a reference plane which varies from the true inclination of the spindle axis with respect to that plane as the wheel rotates. Such angular deviation in the vertical plane is a run-out error in camber and a corresponding angular deviation of the stub shaft axis in the horizontal plane is a run-out error in toe. Run-out can occur either because the fixture is clamped onto the wheel rim so that the axis of its stub shaft or equivalent is not parallel to the spindle axis or because the wheel rim itself is not in a plane perpendicular to its axis of rotation. Either or both of these conditions will produce run-out.

The U.S. Pat. No. to Senften 3,892,042, issued July 1, 1975, recognizes that run-out will introduce errors in the measurement of toe and camber angles of the vehicle wheel when employing a fixture of the general type previously mentioned. The solution proposed by the aforesaid Senften patent requires the rotation of the wheel into two precisely predetermined positions that are exactly 180° apart, coupled with the generation of separate and discrete inclination signals at each of said two positions. Inclination measurements are made for both toe and camber, but in either plane such measurements must be obtained at each of two wheel rotational positions which are exactly 180° apart. To obtain the true inclination of the axis of rotation of the wheel in each of the desired planes, Senften adds the two discrete and individual inclination readings taken exactly 180° apart and divides them by two. The result of this operation cancels out the effect of run-out and hence gives the true inclination of the wheel axis relative to the desired plane, such as either the vertical or the horizontal plane. No measurement of the maximum run-out error (which may occur at any angular wheel position) is provided by this method.

In order to provide optimum accuracy when employing the run-out compensation method of the Senften patent, it is essential that measurements be taken exactly 180° apart, and, therefore, the position of the switch feelers 33, 34 relative to the operative edges of the slots 24-26 in the disc 23 of the Senften apparatus must be precisely adjusted or positioned, and the precise point of operation of the switches must be maintained during the life of the apparatus.

SUMMARY OF THE INVENTION

The run-out correction system of the present invention does not require the use of position-sensitive switches or their equivalent and does not require the production of two discrete run-out measurements at two positions of the wheel that are precisely 180° apart, as in the aforesaid Senften patent.

The run-out correction system of the present invention can be characterized as a continuous or "on the fly" system. Briefly, the steps employed in utilization of the system of the present invention are as follows:

1. Jack up the wheel, paying no attention to the rotational position of the wheel.
2. Activate a single main switch from "stop" to "start" which readies the system for determining the run-out correction and for determining the true or corrected inclination of the wheel axis in both the camber or toe planes. As mentioned, the wheel can be in any rotational position when the aforesaid switch is actuated.
3. After switch actuation, rotate the wheel through at least one revolution, stopping the wheel at any position. After the wheel has made one revolution, it is immaterial whether rotation of the wheel continues for a partial revolution or even whether two or more complete revolutions are imparted to the wheel.

At the completion of this simple operation, the system of the present invention will have determined the true angular inclination of the wheel axis in the vertical and horizontal planes and will have also determined that portion of the total (maximum) run-out which is applicable to inclination measurements made in both planes at the stopped position of the wheel, and the system will provide signals proportional to those portions of the total run-out errors (run-out corrections) in both planes which are applicable to the wheel at its randomly stopped position.

4. Return the switch to "stop". This stores the run-out errors or correction (not to be confused with total or maximum run-out) existing at the final wheel position with the wheel jacked up.

5. Lower the wheel to the ground without rotating it.

The wheel now assumes a new camber and toe angle, which angles include run-out error. On completion of this last step, the system of the present invention will automatically apply the appropriate run-out corrections to the final (set down) camber and toe angles of the wheel, and the actual or true camber and toe angles of the wheel are displayed for utilization by the mechanic for making the necessary adjustments to the wheels.

Briefly, the continuous or "on the fly" run-out correction system of the present invention is one wherein the test instrument for each front wheel includes a fixture that is detachably mounted on the wheel and comprises a sensor support member that is rotatably mounted on the fixture about an axis that is determined by the mounted position of the fixture, and the support member is gravity stabilized as the wheel and the fixture are rotated about the wheel axis. The sensor (for measuring toe, camber, or both) detects variations in the angular inclination of the fixture axis (due to gyration of the axis caused by run-out) during wheel rotation and provides inclination signals proportional to the inclinations of the fixture axis relative to a selected alignment plane (vertical, horizontal or both) with the wheel raised.

Wheel rotation is started at any random starting position and after the wheel has been rotated at least 360° or more, wheel rotation is stopped. The system will continuously provide fixture axis inclination signals which begin at any random wheel position and continue during the entire wheel rotation. The maximum and minimum fixture axis inclination angles in either a vertical alignment plane, a horizontal alignment plane, or both, are obtained from said continuously provided fixture axis inclination signals. The system takes half the sum of the maximum and minimum fixture axis inclination signals and provides preliminary inclination signals proportional to the actual (true) angular inclination of the wheel axis in a selected alignment plane and with the wheel raised.

In addition, the system automatically substracts the aforesaid preliminary inclination signals from the intermediate inclination signals that exist when the wheel is stopped (at any random stop position) to provide run-out error signals proportional to those portions of the total run-out that are applicable to the wheel at its stopped position. These signals represent the run-out errors (or corrections) in the vertical (camber) plane and in the horizontal (toe) plane.

Although the generation of the aforesaid run-out correction signals may have utility in and of themselves, preferably, the corrections are stored and the wheel is lowered to the ground, whereupon the sensors measure what will be termed the final inclination angles of the fixture axis in the aforesaid planes. The system automatically subtracts the aforesaid run-out error signals from the final inclination signals, and the true angles of camber, toe, or both, of the wheel (measured angles corrected for run-out) are computed and displayed for utilization by the mechanic.

More specifically, although the automatic run-out correction system of the present system could employ microprocessor devices with the appropriate software or analog computing devices, such as operational amplifiers, etc., in the preferred embodiment to be later described in detail, comparison, storage and computing elements, etc. operating with digital signals are employed. Hence, the following summary is to be considered only as an example of an actual system and is not intended to be limiting with respect to the actual circuitry used in carrying out the method of the present invention.

For example, and referring to the obtaining of the run-out correction signal in the vertical (camber) plane, the inclination of the fixture axis from the horizontal is measured (in the illustrated embodiment) by an inclinometer and these analog measurements are converted into digital information. The system includes a comparator and signal storage device or latch combination for obtaining the maximum inclination measurement during wheel rotation and a companion component combination for obtaining the minimum inclination.

A start switch is moved from a "stop" position to a "start" position with the wheel at any random position, whereupon the latch for the maximum inclination measurement is cleared (all bits are zero) and that for the minimum measurement is set or loaded with maximum capacity (all bits are ones).

Since the computation systems for the measurements of both toe and camber are substantially identical, brief reference will herein be made to only one of these systems, namely the camber run-out correction system. The angular measurement inclination signals from the inclinometer are analog (voltage) signals and these are converted into digital information for computation. In the preferred embodiment to be described, the information is presented as 8 bits in a binary system. After the switch is moved to "start", the wheel is rotated through at least one revolution, although it could have been set in motion before operation of the switch.

As the wheel is rotated, measured inclination signals continuously enter the maximum and minimum comparators directly, and each comparator compares each new signal from the inclinometer with the inclination signal previously loaded into the associated latch. This comparison and loading of the maximum latch with new measurement signals continues so long as the measured inclination signal entering the maximum comparator directly from the inclinometer is greater than that previously set into its associated latch. As the run-out error is increasing, each new signal from the inclinometer will cause the latch to be updated. At the time that the measured inclination signal matches the signal previously loaded into the latch, the comparator will not provide a load signal to the latch because now the signal stored in the latch represents the maximum measured inclination angle. It should be noted that the actual rotational position of the wheel at this time is not determined and is immaterial to operation of the system.

Continued rotation of the wheel will cause the measured inclination angle signals entering the comparator directly from the inclinometer to decrease from the maximum value stored in the associated latch, and although these lesser signals enter the comparator, since they are less than the maximum signal stored in the latch, the comparator does not provide "load" signals to the maximum latch or storage device and the aforesaid lesser signals are not admitted to that latch. Thus, the maximum measured inclination signal will be stored in the latch for use in further computations.

The circuits for determining the minimum measured inclination signal can be termed symmetrical mirror images or inversions of those for determining the maximum signal. More specifically, instead of being initially loaded with zeros, the latch or storage device is initially loaded with some maximum value (such as all ones in the binary system) that is greater than any possible inclination signal. As the wheel is rotated the first inclination signal to the comparator will be compared with the large signal preset into the minimum latch and will necessarily be smaller than said preset latch signal. Under these circumstances, a load signal will be sent by the minimum comparator to the minimum latch, which will admit the first measured inclination signal.

As wheel rotation continues the output terminal of the comparator will only cause the latch to be loaded with signals that are less than the signals previously received. When the minimum inclination signal is received by the comparator, it will be less than the signal previously loaded into the minimum latch, and the comparator will provide its final load signal to load the latch with said minimum signal. Continued rotation of the wheel will cause the measured inclination signals from the inclinometer to increase, and there will be no "load" output from the comparator to the latch.

Thus, if the wheel is rotated at least 360° during these measurements, both the maximum and the minimum inclination signals will have been stored in their respective latches.

Preliminary Inclination Signal (Camber)

The aforesaid minimum and maximum inclination signals stored in their respective latches enter a first adder which adds them and divides their sum by two. The output of this operation is the aforesaid preliminary inclination signal, which represents the true inclination of the spindle axis in the vertical plane (with the wheel raised).

Run-Out Error (Camber)

In the complete system, the aforesaid computed true inclination is continuously subtracted from the currently measured inclination signal from the inclinometer in a second adder until the wheel is stopped. The wheel may be stopped at any location. As mentioned, after wheel rotation has stopped, the output from the second adder will be that portion of total (or maximum) run-out in the vertical plane which is applicable to the wheel at its stopped position. This value, which is the run-out error (numerically equal to the run-out correction), is stored by returning the switch to "stop".

Corrected Display (Camber)

When the wheel is subsequently set down, a final inclination angle is obtained from the inclinometer and presented to a third adder which subtracts the aforesaid run-out correction therefrom, the output of the third adder being true wheel camber corrected for run-out. This output is converted to an analog signal and is displayed or otherwise utilized for providing information to the mechanic for making the necessary camber adjustment.

Toe

The circuit for obtaining the run-out correction in the horizontal plane (toe) is a substantial duplicate of that just described, except that the input to the circuit comes from a sensor that measures the inclination of the wheel in the horizontal plane with respect to a reference line such as the longitudinal centerline of the vehicle, or a line perpendicular thereto. Where both toe and camber run-out correction circuits are employed they can both be operated by the same start-stop switch.

DESCRIPTION OF THE PREFERRED EMBODIMENT

To illustrate the principles of the present invention, a specific fixture mounting a pair of specific angle sensing instruments is shown. It will be appreciated, however, that the specific hardware and instruments shown form no part of the present invention and are disclosed for illustrative purposes only so that the principles underlying the method and apparatus of the present invention can be more readily understood.

Fixture Mounting

Figure 1:
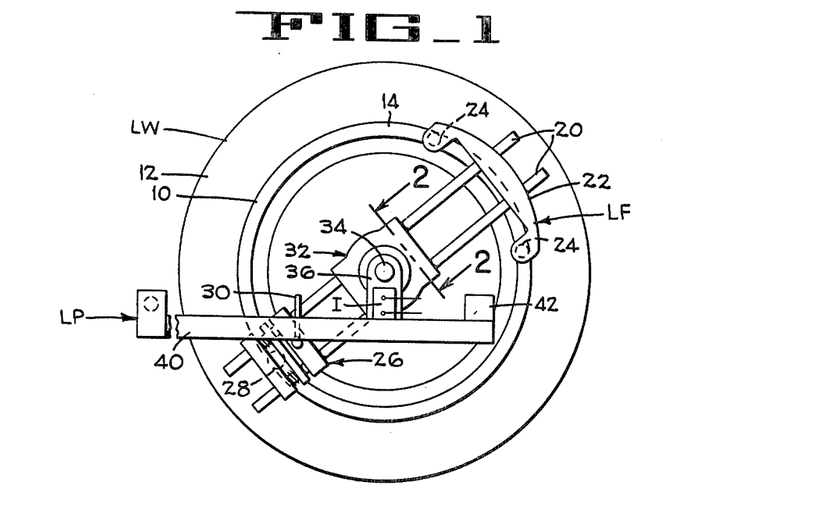
FIG. 1 is a side elevation of a left front wheel with a fixture clamped to the rim mounting both toe and camber sensors.
Figures 2, 3:
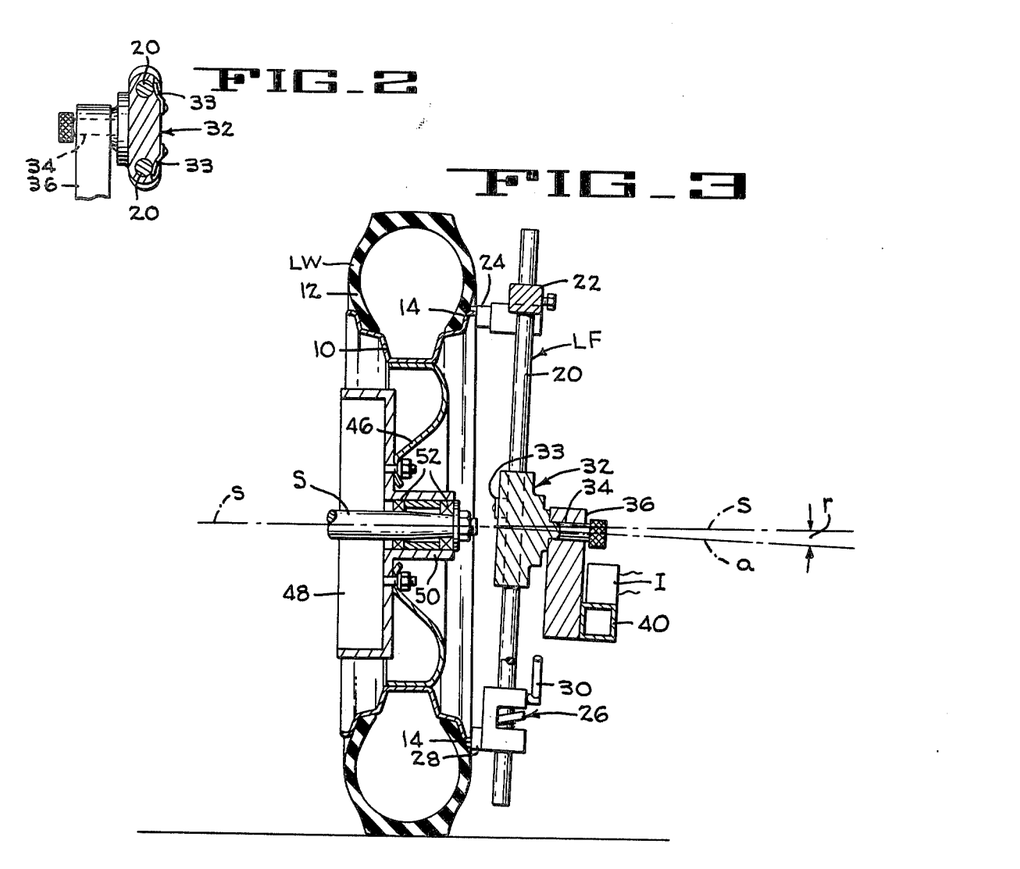
FIG. 2 is an enlarged section through the fixture slide, taken on line 2—2 of FIG. 1.
FIG. 3 is a vertical front view section through the front wheel showing the fixture clamped thereon with the pendulous sensor mounting bar being shown in section.

Referring to FIGS. 1, 2 and 3, an installation for a left front wheel LW is illustrated. The wheel includes the usual rim 10 and tire 12 retained by rim side flanges 14. A left fixture LF is mounted on the rim. The details of the fixture and its clamping structure are not critical to the present invention (as mentioned hereinbefore), and the clamping structure shown herein resembles that shown in Holmes U.S. Pat. No. 2,457,502, issued July 5, 1949 and incorporated herein by reference.

The fixture includes slide rods 10 mounting an adjustably positioned clamp 22 adjacent the ends thereof. The clamp 22 mounts spaced clamp jaws 24. The other ends of the slide rods 20 mount a two-piece, quick acting clamp 26, one portion of which includes a single jaw 28 for engaging the rim flange. The clamp 26 is operated by a clamp handle 30, as disclosed in detail in the aforesaid Holmes patent.

In order to mount a sensor support member, the fixture includes a slide 32. The slide 32 is manually positioned along the rods 20, and, as shown in FIG. 3, its position is maintained by friction clips 33. The slide 32 has a projecting stub shaft 34, and upon installation the slide is positioned on the rods 20 so that the stub shaft 34 is in substantial alignment with the axis "s" of wheel rotation (FIG. 3), which axis corresponds with the axis of the wheel spindle S.

In order to mount the sensor elements so that they do not rotate with the wheel during rotation of the wheel, a sensor support bracket 36 is pivotally mounted on the stub shaft 34 and depends therefrom. The lower end of the bracket 36 mounts a longitudinal cross bar 40. In order to measure inclination of the stub shaft 34 in the vertical plane, an inclinometer I is mounted on the cross bar 40 beneath the stub shaft 34. Details of the iclinometer are not critical to the present invention and an inclinometer such as that shown in the aforementioned U.S. Pat. No. 3,892,042 to Senften can be employed.

In order to measure inclination of the stub shaft 34 in the horizontal plane (toe) the front end of the cross bar 40 is, in the present embodiment, provided with a left projector LP which projects a left beam LB (FIG. 4) to a right sensor RS mounted on the right wheel RW. A left sensor LS is also mounted at the front end of the left wheel bar 40 for receiving right beam RB (FIG. 4) from a projector (not shown) which is like the projector LP but is located on the fixture RF mounted on the right wheel RW. The sensor support bar 40 is counterbalanced so that it maintains its horizontal position by means of a counterbalance weight 42 (FIG. 1). The fixture RF for the right wheel RW is identical to the fixture LF shown in FIG. 1 except that the toe sensors and projectors of the fixture RF face oppositely to the corresponding elements of the left fixture LF. Both fixtures have support bars 40 mounted on depending brackets 36, as previously described, which brackets are pivotally supported by the fixture stub shafts 34, as described.

As seen in FIG. 3 (front view), the left wheel LW, in addition to the usual rim 10, previously described, has a wheel body 46, the mounting flange of which is bolted to a brake drum 48 having a hub 50 supported by the usual bearings 52 for the front wheel spindle S. The axis of wheel rotation is indicated at "s" in FIG. 3 but the rim flange 14 may not be perpendicular to the wheel rotational axis "s", or,even if the rim flange does run true the fixture LF may be inclined relative to a plane perpendicular to the axis "s" of wheel rotation (as shown in FIG. 3). In either case, the axis "a" of stub shaft 34 may be inclined from the axis "s" of wheel rotation by a small angle illustrated at "r". For simplicity of illustration, the inclination angle "r", which defines the run-out angle, is shown as having its maximum value in the vertical plane although, as will be seen, the position of the maximum run-out angle, or run-out error, rotates as the wheel rotates because the stub shaft axis "a" gyrates about the wheel axis "s".

Toe Instrumentation

Although the instrumentation for measuring the inclination (in the horizontal plane) of the wheel rotation axis "s" relative to a reference line connecting the wheels (toe angle) is not critical to the present invention, the cross-toe measurement system shown in the copending application of Andrew K. Chang, Ser. No. 834,636, filed Sept. 16, 1977 and assigned to the FMC Corporation, is partially illustrated herein, and the disclosure thereof is incorporated herein by reference.

Figure 4:
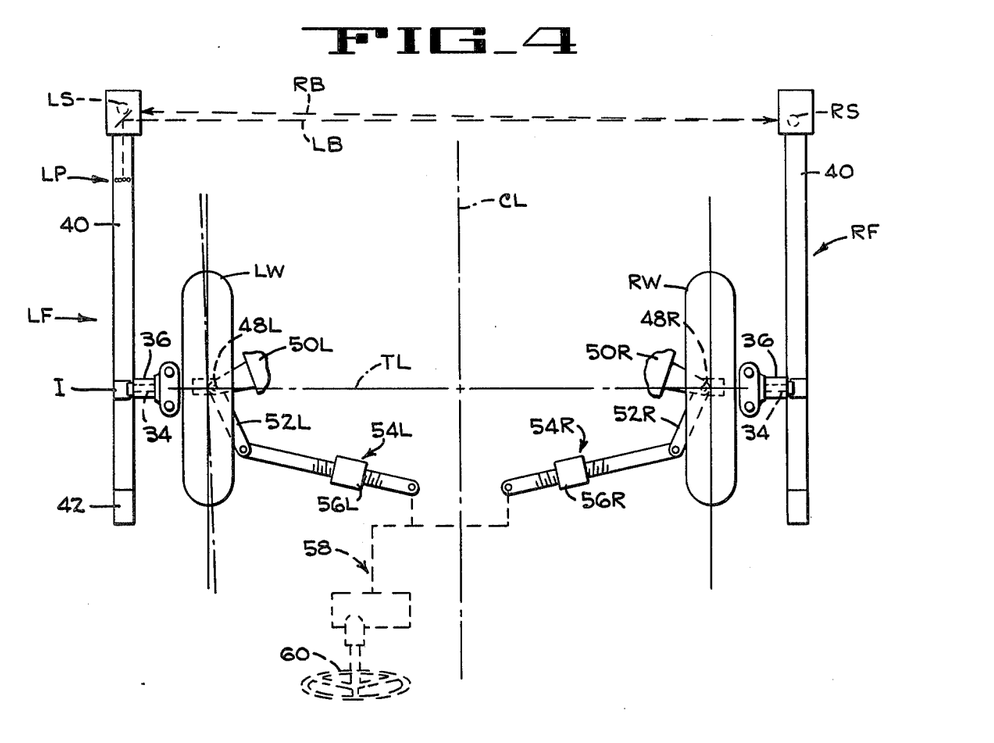
FIG. 4 is a schematic plane view of the front end of an automobile showing one example of a toe angle measuring system, namely, a cross-toe system.

Referring to the plan diagram of FIG. 4, the left and right wheels LW, RW have the usual ball joints or king pins 48L, 48R, which are supported by the usual suspensions, such as A-frame structures 50L, 50R. The wheels have the usual steering arms 52L, 52R connected to conventional drag links 54L, 54R, and the toe angles of the wheels can be individually adjusted by threaded adjusting sleeves 56L, 56R. The drag links are operated be a conventional steering mechanism indicated at 58 and it is customary to have the mechanism adjusted so that when one spoke of a three spoke steering wheel 60 is vertical, or the spokes of a two spoke wheel re horizontal, the front wheels should be at the factory-set toe angle relative to the longitudinal centerline CL of the vehicle or relative to a transverse reference line TL that is perpendicular to the centerline and connects the wheel pivot axes at 48L, 48R.

Figure 5:
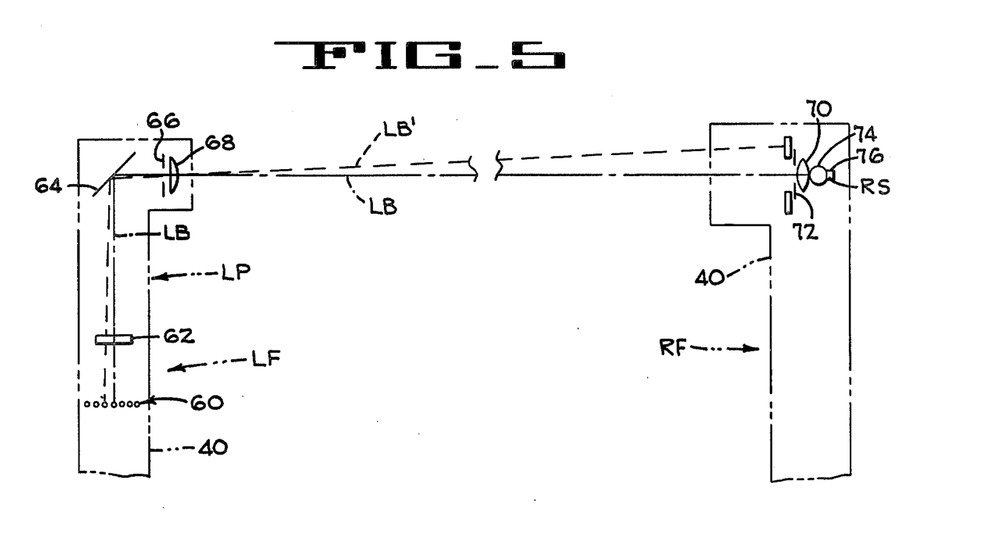
FIG. 5 is a diagrammatic plan view of a toe measuring system for a left wheel.
Figure 8:
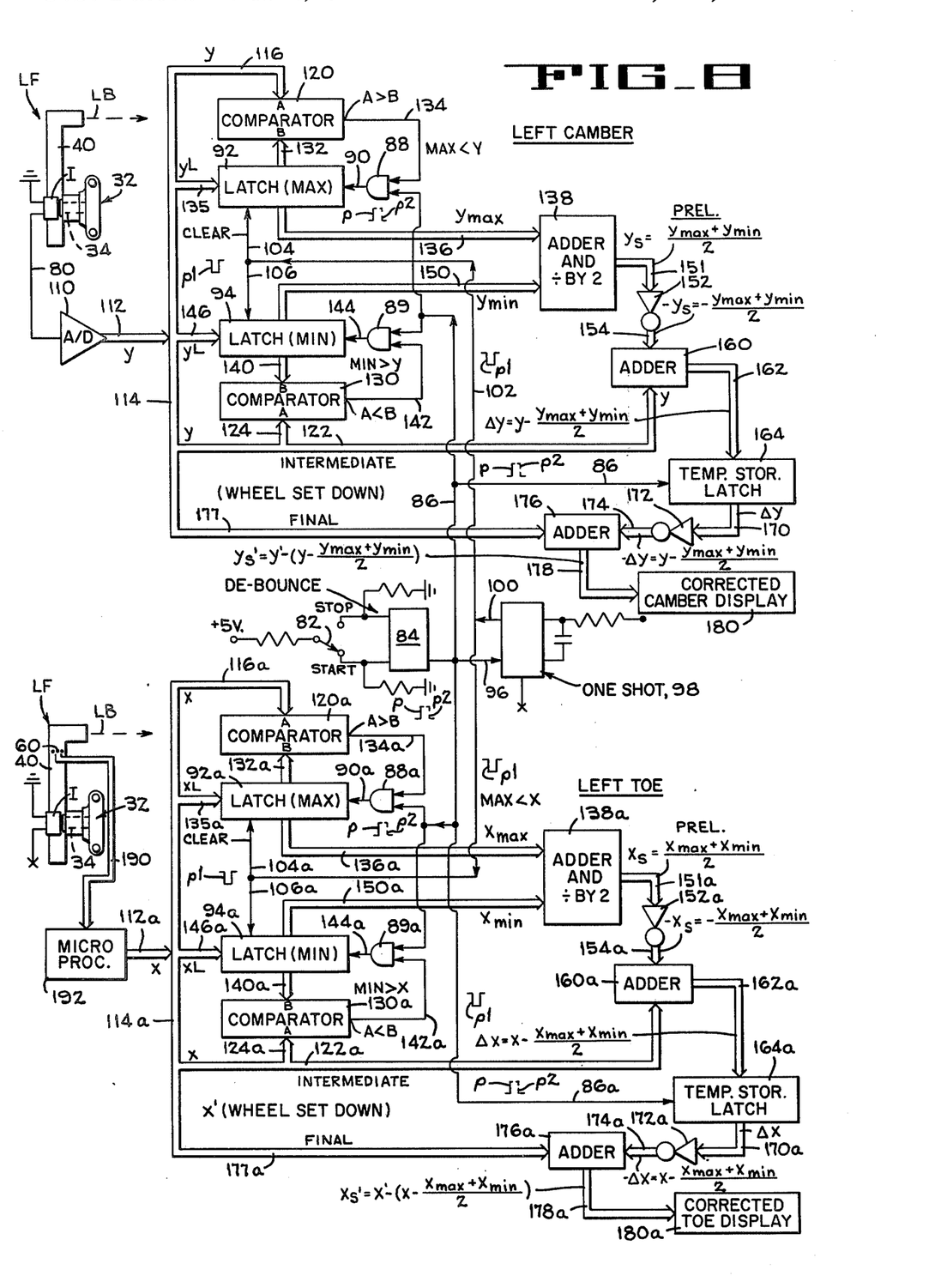
FIG. 8 is a schematic diagram of paired circuits for obtaining the run-out corrections and corrected camber and toe angles.

Toe projector and sensor units for the left wheel are shown in the diagram of FIG. 5, which corresponds to the diagram of FIG. 8 of the aforesaid copending Chang application Ser. No. 834,636. For measuring toe of the left wheel LW, the left fixture LF includes a linear array 60 of light emitting diodes (LEDs). As explained in the aforesaid copending Chang application, these diodes are sequentially energized, and an electronic system is provided for determining which diode is energized at any given time. With reference to FIG. 5, when the center LED of the array 60 is energized, a beam of light indicated by a broken line LB (only the principal beam is shown) passes through a cylindrical lens 62, is turned 90° by a mirror 64, then passes through the center portion of a mask 66 and is focused by a lens 68 onto a condensing lens 70 provided in the toe sensing structure for the right hand wheel fixture RF. A mask 72 is also provided ahead of the condensing lens 70. The condensing lens 70 transmits the beam LB to a spherical lens 74 the rear face of which is flattened slightly to mount a photo-transistor 76, comprising the right sensor RS. In the diagram of FIG. 5, when the center LED of the array 60 is energized, that fact will be signaled to the computing instrumentation by photo-transistor 76 at the opposite wheel.

Also indicated in FIG. 5 is a light beam LB' (shown in dashed lines) which emanates from a different LED in the array 60. This beam diverges from the beam LB and does not strike the condensing lens 70, and hence, no signal from the photo-transistor 76 is provided. Thus, as the angular disposition of the bar 40 on the left fixture LF changes in the horizontal plane (toe), the positon of the fixture (and hence the toe angle of the associated left wheel) is determined by ascertaining which of the diodes in the array 60 of the LEDs must be illuminated to generate a signal in the photo-transistor 76. This system of measuring toe angle is explained in detail in the aforesaid copending application of Chang and does not require further elaboration for purposes of explanation of the run-out correction system of the present invention. It is to be understood that other toe sensor mechanisms, mirror systems, etc. can be employed so long as they provide signals which can be used to indicate the position of the axis "a" of the fixture stub shaft 34 in the horizontal (or toe) plane.

The Run-out Circle

Although the run-out error can be explained by the use of a sine curve, as in the aforesaid Senften patent, applicant prefers to illustrate the run-out error and the correction therefor in both toe and camber utilizing a representation known as the "run-out circle".

Figures 6, 7:
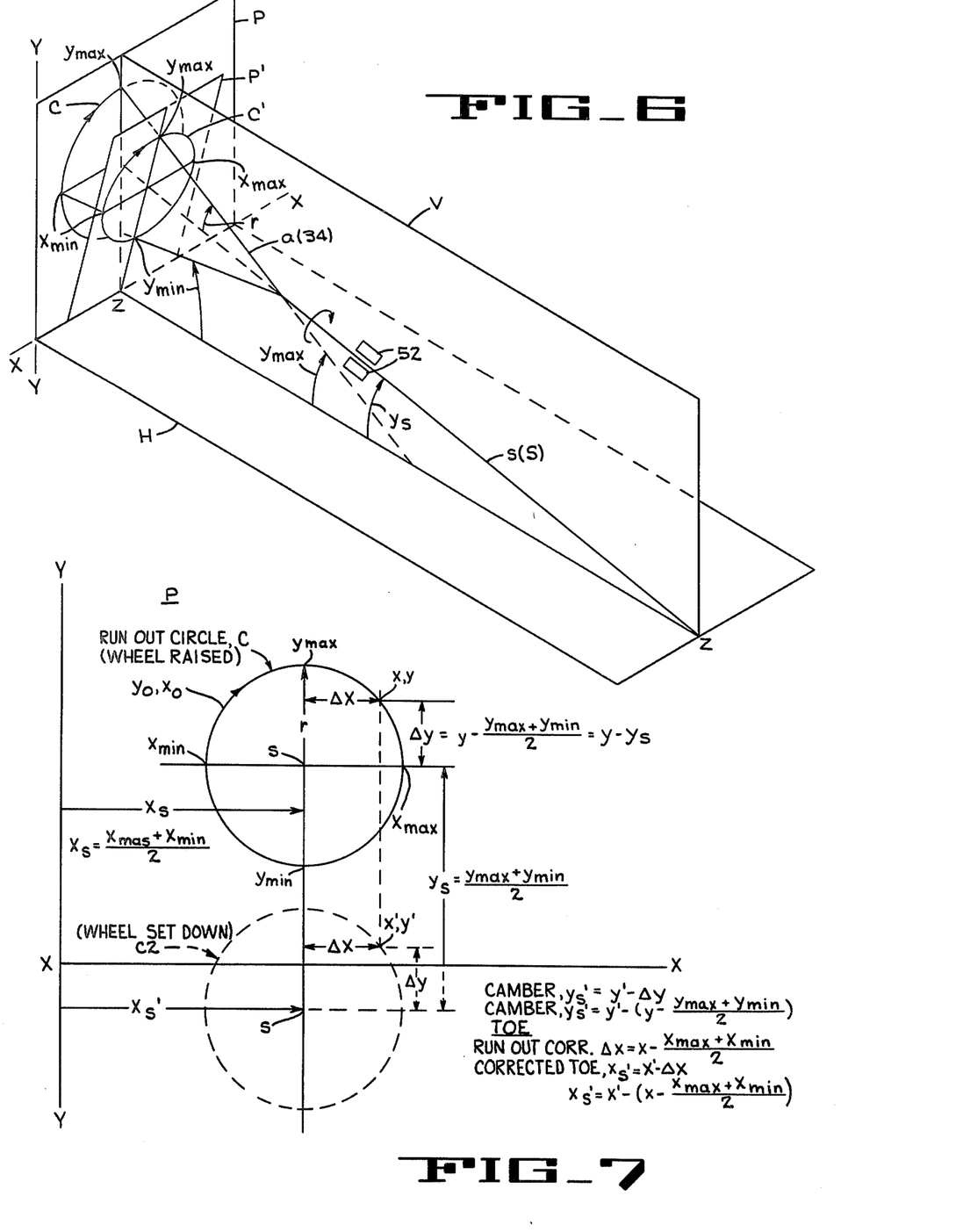
FIG. 6 is a perspective diagram illustrating the run-out circle.
FIG. 7 is a diagram illustrating the principles of obtaining run-out corrections and corrected camber and toe angles, using the run-out circle as a basis for the illustrative explanation.

Referring to FIG. 6, generation of a run-out circle is illustrated. It is to be understood that this is a purely imaginary circle (i.e., not physically defined in the system of the present invention) but that it is useful in illustrating and calculating run-out errors and the corrections therefor.

Shown in the diagram of FIG. 6 is a horizontal plane H, which is the plane in which wheel toe is measured. Perpendicular to the horizontal plane H and intersecting it along a horizontal axis Z-Z is a vertical plane V, the plane illustrated passing through the wheel rotation axis "s" of the wheel spindle S, as the wheel rotates in its bearings 52 (FIG. 3). Run-out in camber is measured as an angle in the vertical plane V.

Also shown in FIG. 6 is a vertical plane P which intersects the horizontal plane H along a horizontal reference line X-X, and which is perpendicular to the axis Z-Z. The plane P contains an arbitrary vertical reference line Y-Y. A plane P' also intersects the line X-X and is perpendicular to the axis "s" of wheel rotation.

When the fixture axis "a" of the fixture mounting stub shaft 34 is at an angle "r" to the axis "s" of wheel rotation, the condition known as run-out occurs, and the angle "r" will be referred to as the total (or maximum) run-out error. If the axis "a" can be considered to extend and intersect the planes P and P' as the wheel is turned, this intersection will form an imaginary circle C' in the plane P' which is the true run-out circle. Also, the intersection of the fixture axis "a" with the vertical plane P as the wheel rotates forms another imaginary run-out "circle" C in the plane P, which can also be considered to represent a run-out circle. This run-out circle represents the run-out circle which is actually measured with the sensors aforedescribed since the inclinometer references all camber angle measurements with respect to the true vertical plane. In principle, however, if the vertical plane P is not perpendicular to the axis "s", the run-out "circle" C in the vertical plane P would be slightly elliptical, but in practice, the differences between the shape of the run-out circle C' in the plane P' and the run-out circle C are smaller than the normal reading errors that may arise in the measurement of the angles in the toe and camber planes. Hence, the circles C and C' can be considered to be interchangeable. In the diagram of FIG. 6, the inclination of the fixture axis "a" from the wheel rotation axis "s" is indicated as an angle "r", which is the total (maximum) run-out angle and which can also be considered to be a function of the radius of both run-out circles.

As indicated in FIG. 6, as the wheel is rotated, the intersection of the fixture axis "a" in vertical plane V with the plane P' becomes a maximum inclination angle $y_{max}$ at the top of the run-out circle C' and becomes a minimum inclination angle $y_{min}$ at the bottom thereof. The same remarks apply to run-out circle C in plane P.

Similarly, as shown in FIG. 6, as the wheel is rotated, the intersection of the fixture axis "a" with the plane P' in a plane parallel to the horizontal plane H (Toe) becomes a point $x_{max}$ of maximum inclination from arbitrary reference line Y-Y at the right of the circle C' and becomes a point $x_{min}$ of minimum inclination at the left of the circle. Again, the same remarks apply to circle C in plane P. Thus, for run-out circle C, the position of the run-out circle as a whole varies in accordance with the position of the rotational axis "s" of the wheel spindle in relation to the reference lines X-X and Y-Y. At any point on the run-out circle, the sensors can be considered to measure the inclination of axis "a" in the vertical plane as displacement from the horizontal reference line X-X and its inclination in the horizontal plane as displacement from the vertical reference line Y-Y.

Representation of Camber and Toe Using a Run-Out Circle

FIG. 7 is a diagram showing how camber and toe angles and their appropriate run-out corrections can be illustrated using the previously described convention of an imaginary run-out circle.

Camber

Assume that the wheel to be checked, say the left front wheel, has been jacked up so that it can be rotated to obtain inclination angle measurements from the inclinometer I. In practice, the opposite or right front wheel is jacked up at the same time for measurements on that wheel. However, the diagram of FIG. 7 pertains only to measurements made on one wheel.

In measurements for camber, the signals from the inclinometer I, representing inclination of the fixture axis "a" in the vertical plane, can be represented in FIG. 7 as a vertical displacement of points on the run-out circle from the horizontal reference line X-X, that is, displacement along the vertical reference line Y-Y. Employing the system circuitry, to be described presently, a "start" switch is operated and the wheel is rotated through at least 360° (and probably more) from any random starting position. We assume that after the wheel rotation has stopped, axis "a" of the fixture hub 34 will be at the point x, y on the run-out circle C. During the rotation of the wheel for measurement purposes, the inclinometer will necessarily measure a maximum inclination angle $y_{max}$ in the vertical plane and a minimum inclination angle $y_{min}$. These inclination angles are indicated by the position of points so marked on the run-out circle C in the vertical plane P, in FIG. 6.

When the wheel is stopped after at least one measurement revolution, the inclinometer will indicate an intermediate inclination angle in the vertical plane which can be represented as the position of point y on the run-out circle C (FIG. 7), with the wheel raised.

The inclination angle y, illustrated in FIG. 7, differs by a run-out error angle $\Delta y$ from the inclination angle $y_s$ of the wheel rotational axis "s". It can be seen from FIG. 7 that $y_s$ is the true inclination of the wheel rotation axis "s"; although $y_s$ is not measured directly by the inclinometer, it has been referred to as a preliminary inclination signal. The inclination $y_s$ is obtained by adding the maximum and minimum y inclination values obtained during the wheel rotation period and dividing their sum by two. It can also be seen from FIG. 7 that the run-out error correction in camber, $\Delta y$, is equal to the intermediate measured inclination angle y at the stopped wheel position minus $y_s$.

FIG. 7 also shows in dashed lines the same run-out circle, now entitled C2, when the wheel has been set back down to the ground. The points x, y will now be at new positions x', y'. Thus, with the wheel down, the inclinometer will measure a final inclination angle y' of the axis "a" in the vertical plane, but the value of the run-out correction $\Delta y$ will be unchanged, so long as the wheel is not rotated as it is set down. Thus, when the wheel is set down true camber $y_s'$ will equal the final inclination angle y' minus Δy, and the complete formula for true camber $y_s'$ appears in FIG. 7 at the lower right hand corner. As will be seen, the measuring and correcting system of the present invention has an analog output displaying true camber $y_s'$ when the wheel is set down.

Toe

The toe in or toe out angle of the wheel in the horizontal or toe plane is measured by instrumentation which can provide inclination angle signals corresponding to wheel toe, a cross-toe measurement system having been previously described in connection with FIGS. 4 and 5. As pointed out hereinbefore, the principles of the system of the present invention are independent of the instrumentation.

During the aforesaid rotation of the jacked up wheel for determining the run-out correction, the stub shaft axis "a" will have passed through a point $x_{max}$ of maximum inclination in the toe plane and a point $x_{min}$ of minimum inclination.

The run-out error Δx in the toe plane is computed, as in the case of camber, by adding the maximum and minimum x inclination values, dividing their sum by two to obtain a preliminary inclination angle $x_s$, and subtracting $x_s$ from an intermediate inclination angle x measured when the wheel is stopped. To obtain the toe angle $x_s'$, corrected for run-out when the wheel is set down, the run-out error Δx is subtracted from a final inclination angle x'. The complete expression for $x_s'$ is given in FIG. 7 in the lower right hand corner thereof.

Circuitry Implementation

FIG. 8 is a simplified schematic diagram of the entire system of the present invention illustrating the principles of a preferred system for the determination of the run-out errors (corrections) in both the camber and toe planes as well as for the determination of camber and toe corrected for run-out. The circuitry of FIG. 8 applies only to one wheel, such as the left wheel, but it will be understood that companion instrumentation will be provided for the opposite wheel. The principles of camber determination were mentioned in the Summary of the Invention and in the description of FIG. 7, and these principles are also employed for the determination of toe. The system diagrammed is digital, but the signals from the sensor instruments may be either analog or digital signals which are proportional to the camber and toe angles actually measured.

Camber

Referring to the upper portion of FIG. 8, the inclinometer I provides an analog voltage signal in line 80 which represents the inclination y of the fixture axis in the vertical plane at any wheel position. However, before the signals from the inclinometer are employed for calculations, a stop-start switch and de-bounce and one-shot circuits are activated. A single stop-start switch 82 controls both the camber and the toe systems. Its movable pole is connected to a voltage source, such as +5 volts DC, and both the fixed stop and start contacts are grounded as well as being connected to a "de-bounce" circuit 84, the details of which are not critical to the present invention. Functionally, when the switch is at "stop" the output of the de-bounce circuit is a low voltage, or a "zero" in binary terminology. When the switch is on "start" the output goes positive to a high voltage or to a "one" in binary terminology. The purpose of the de-bounce circuit is simply that of precluding false oscillatory signals when the center pole of the switch is moved away from one contact or the other.

The preferred circuit to be described is a digital or binary circuit but it will be understood that the same computations can be made by an analog computing circuit using operational amplifiers, resistors and other conventional analog circuit elements.

When the stop-start switch 82 is moved to "start" a positive going voltage p appears on a line 86. The voltage on line 86 remains positive so long as the switch 82 is on "start" and is applied to one input terminal of an AND gate 88, the output of which can provide a load signal in its output line 90 to a latch or signal storage register 92. The function of latch 92 is to store the maximum y or camber inclination angle input received from the inclinometer during at least 360° of wheel rotation after the switch is moved to "start". The voltage p on line 86 also enters an AND gate 89 for loading a latch or storage register 94 for receiving and storing the minimum inclination angle y measured by the inclinometer.

The positive going voltage p, generated when the switch is turned to "start", also appears on a line 96 connected to the trigger input of a mono-stable multivibrator, or one-shot circuit, 98, the terminals of which are also connected to the usual positive voltage supplies. When sensing the positive going edge of the voltage p from the switch, the output line 100 of the one-shot 98 provides a negative-going pulse p1 to a line 102 that connects to the latches 92, 94 in both the camber and the toe measuring circuits. For example, in the camber circuit, the negative-going pulse p1 on line 102 is connected by a branch line 104 to the "clear" input of the maximum latch 92 so that the value initially set into the batch 92, is a minimum value, namely, in a binary circuit all zeros.

The negative-going pulse p1 on the line 102 also connects to a line 106 to the preset input of the minimum latch 94. This pulse will load the minimum latch to its maximum value, namely, in a binary circuit all ones.

At this point, it will be assumed that the wheel has been jacked up, the switch has been turned to "start", and that rotation of the wheel for obtaining inclination angle changes (run-out error) has been started. The inclination signal from the inclinometer I, which is an analog signal in the line 80, is converted into digital information (8 bits in the present example) by an A/D converter 110. This digital inclination signal, designated as y in FIG. 8, enters the camber system by a main line 112. It will be noted that line 112 and other lines in the circuit are wide lines, this convention being adopted to indicate that these lines contain a number of bits (e.g., 8 bits) of digital information as opposed to the voltage signals in lines 86, 102, previously described.

The measured inclination signal y that was present when the switch was turned to "start" appears on line 114 which has a branch 116 that presents this information to what will be termed the A input of a comparator 120. The comparator is employed in the circuit for obtaining $y_{max}$. The measured inclination signal y in line 114 is also presented to branch lines 122 and 124 that present the measured inclination angle to the A input of a minimum comparator 130.

Although the magnitude of the inclination signal y first presented to the circuit is immaterial, insofar as circuit operation is concerned, for purposes of explanation it will be assumed that at the starting point $y_o$, $x_o$ (FIG. 7) the measured inclination angle y is greater than the minimum angle and less than the maximum angle.

Determining $y_{max}$

Referring first to the determination of $y_{max}$, when the switch is turned to "start", the existing inclination signal y enters the A input of the maximum comparator 120 directly by the branch line 116, as previously described. Also, the value stored in the latch 92 will enter the B input of the comparator 120 by an input line 132. An enabling pulse to AND gate 88 is provided at the A>B comparator output line 134 whenever the measured value of y received from the line 116 (A) exceeds that received from the latch 92 via line 132 (B). Under the assumed conditions, since the measured angle y in line 116 is greater than the zero that was in the latch 92, a positive going load pulse in comparator output line 134 will be presented to the AND gate 88. Since the other terminal of the AND gate also receives a positive voltage p from the start switch, a load signal from that gate will appear on its output line 90 and the latch 92 will now open to receive the measured inclination signal y from a branch line 135 of the line 114. This newly loaded angle measurement is indicated at yL, and the measurement yL loaded into the latch equals the signal y introduced into the comparator when the switch was turned to "start".

The operator may now start wheel rotation in order to determine run-out error and camber corrected for run-out (it is actually immaterial whether wheel rotation is started before or after placing the switch on "start"). It will be recalled that it was assumed that the position of the wheel at the start is such that the inclination signal y is less than the maximum inclination. Under these circumstances, the y input on lines 112, 114 and 116 will progresively increase as the wheel rotates. Each increased y signal enters the A input of the comparator 120 by line 116 and is compared with the previous yL signal entering the B input of the comparator by line 132 from the maximum latch 92. Since the output line 134 of the comparator is an A>B terminal, so long as the measured signal entering the comparator terminal A directly is greater than the input to terminal B from the latch line 132, the comparator will provide a load signal to AND gate 88 which is passed on to the latch 92 by the load line 90. Thus, new, increased measured values of y will be successively loaded into the latch by line 135, each new loaded value becoming yL. When the wheel is rotated to some position (unknown to the operator) wherein the measured y inclination angle reaches its maximum value, this maximum value will enter the A comparator terminal by line 116 and since the aforesaid value is at a maximum, it will be slightly greater than the signal which previously entered the B terminal of the comparator by line 132 from the latch 92. Accordingly, a final load signal in line 90 will be provided which will admit the maximum inclination signal y to the latch by the line 135. Further rotation of the wheel past the maximum inclination position of the axis "a" causes the input signals y entering the system in line 112 to decrease. Under these circumstances, the y signal on line 116 to the A terminal of the comparator 120 will be less than the yL signal 132 from latch 92 to the B terminal of the comparator. Since A is now less than B there will be no load pulse on line 134 from the comparator. Accordingly, the latch 92 presents the maximum signal $y_{max}$ by line 136 to a first adder unit 138.

It should also be pointed out that the system of the present invention is considered to be one wherein the "y" values are "continuously" presented to the computing circuitry even though such values are in digital form. It will be understood that the signals from the A/D converter 110 are considered to be continuous when they occur at short enough intervals whereby no significant information can be lost due to the inherently discontinuous nature of a digital system.

Computing $y_{min}$

The system for determining the minimum inclination value $y_{min}$ is symmetrical to, but a mirror image of that which determines $y_{max}$. It will be recalled that the minimum latch 94 was preset by the negative going pulse p1 from the one-shot 98 and branch line 106 so that it initially stored a maximum value; namely, in the presently described binary system, the bits stored in the minimum latch 94 were all ones when the latch was preset.

For consistency in explanation, it will again be assumed that before wheel rotation is initiated for measurement, the wheel is at some position where the camber inclination angle measurement y is greater than its minimum and less than its maximum value. The starting value enters the A terminal of the minimum comparator 130 by branch lines 122, 124 and the B terminal of the comparator receives the maximum value that was pre-loaded into the minimum latch 94, as previously described. In this case, the output line 142 from the comparator 130 is connected to the A<B terminal thereof and is directed to the AND gate 89. When the stop-start switch is on "start", gate 89 is also presented with a positive voltage p from line 86.

The measured A input to the comparator 130 is necessarily less than the pre-loaded maximum B input from the latch 94, and a positive going output pulse will be provided by the comparator on its output line 142, which provides an enabling signal on line 144 to the AND gate 89 for loading the minimum latch 94. This will open the gate and admit from line 146 to the latch the starting inclination yL measured by the inclinometer. This same inclination value will be introduced to the B comparator terminal by line 140 from the latch 94 so that both inputs to the comparator 130 will be the starting measured inclination angle.

Under the present example, since the axis "a" was initially at an inclination y that is greater than its minimum value, but has not reached its maximum value, the rotation of the wheel from its starting point will cause the measured values of y to first progressively increase with wheel rotation up to the maximum value $y_{max}$. These new, increased values of y sequentially enter the comparator 130 terminal A directly by line 124 and will be greater than the starting measured value yL loaded into the latch 94 and received by the comparator terminal B from the latch line 140. Thus, there will be no load enable pulses from the A<B comparator terminal on line 142 to the AND gate 89, and the value stored in the minimum latch 94 (the starting measured value) will remain unchanged, that is, it will remain at the inclination angle that was measured when wheel rotation began after moving the switch 82 to "start".

As wheel rotation continues, the fixture axis "a" will pass through a point wherein the measured inclination input y passes its maximum value and the y input to the minimum comparator 130 begins to decrease. However, until the wheel reaches a position where the measured inclination input y to the A input of the comparator 130 has decreased to the point where it is below the input to terminal B from latch 94, there will be no load outputs from the A<B terminal of the comparator 130 and the measured value initially stored in the minimum latch 94 will remain unchanged.

As wheel rotation continues in a direction of decreasing inclination of axis "a", the y inclination inputs on line 112 to the minimum comparator 130 will now begin to decrease from the aforesaid initial measured value. Under these conditions, the signal entering terminal A of the comparator 130 will be less than that previously stored in the minimum latch 94 and presented to terminal B of the comparator from latch 140. Now the A<B terminal of comparator 130 will provide an enabling pulse on line 142 to the AND gate 89, and the line 144 will thus load the latch 94 with a new, smaller inclination signal yL via line 146. As the measured inclination input signals continue to decrease, the A<B output on comparator line 142 will successively provide enabling pulses on line 142, and the latch 94 will admit these decreasing signals yL from line 146.

When the measured inclination y reaches its minimum value, this value will appear on terminal A of the comparator 130 and will be slightly less than the last value entering comparator terminal B from latch line 140. Hence, the comparator 130 will produce a final enabling pulse on line 142 to the AND gate 89 resulting in a load signal on line 144 for loading the latch 94 with a signal yL from line 146, which is now the minimum inclination signal $y_{min}$. The latter signal now appears on the comparator input terminal B.

As wheel rotation continues past the point of minimum inclination $y_{min}$, the measured inclination values y entering the system start to increase; hence, the signal values in line 124 connected to terminal A of the comparator 130 will be greater than the minimum signal introduced by line 140 to terminal B from the latch 94. Thus, with A now greater than B, there will be no output signals from comparator output line 142 and no load signals from the AND gate 89 in line 144, so the minimum latch 94 will have stored the minimum fixture axis inclination value $y_{min}$.

The $y_{min}$ signal will enter the first adder 138 by line 150 from the latch 94, and if the wheel has been rotated at least 360°, the adder 138 must also have received the maximum inclination signals $y_{max}$ from line 136, as described. Even if the wheel is unnecessarily given considerably more than one complete rotation while the start switch is on "start", the effect will be the same, because the values of $y_{max}$ and $y_{min}$ during any one wheel revolution or partial revolution will not vary significantly from those obtained during a previous revolution of at least 360° from the random start position.

The first adder 138 adds the two signals $y_{max}$ and $y_{min}$ and divides them by two, giving the result as an initial alignment signal output $y_s$ on line 151 from the first adder. The angle $y_s$ represents the true inclination angle of the wheel rotation axis "s" in the vertical or camber plane and has been referred to as a preliminary inclination signal.

Determining Run-Out Correction in Camber

The wheel axis inclination signal $y_s$ in line 151 is inverted in an inverter 152 and appears in its negative form in line 154 that enters a second adder 160. Also, whichever measured inclination angle y that exists when rotation of the wheel is stopped (which has been referred to as an intermediate alignment signal) is presented by branch line 122 to the second adder 160, which subtracts $y_s$ from y. The signal output of the second adder 160 in line 162 is $\Delta y$, the run-out error, numerically equal to the run-out correction. This signal represents that portion of the maximum angular run-out of the fixture axis "a" in the vertical plane that is present at the wheel stopped position. The run-out error signal $\Delta y$ at line 162 enters a temporary storage latch 164 so that it will be available for future use in measuring wheel camber corrected for run-out when the wheel is subsequently set down.

Wheel Camber Corrected For Run-Out

When the operator has stopped rotation of the wheel after at least one revolution, as described, and the aforesaid run-out error signal $\Delta y$ has been stored in the latch 164, the operator is ready to set the wheel down and determine wheel camber connected for run-out, or the true camber angle $y_s'$. Before lowering the wheel, the operator switches the stop-start switch 82 to the "stop" position which generates a negative going voltage transition p2 on line 86, which is the output line of the debounce circuit 84. The low voltage on line 86 disables the AND gates 88 and 89, hence, the latches 92 and 94 cannot now be loaded with new values. Furthermore, the low voltage on line 86 disables the temporary storage latch 164 and causes the run-out error signal $\Delta y$ stored therein to appear on its output line 170. The run-out error signal $\Delta y$ is rendered negative by an inverter 172, which may be incorporated in the latch 164, whereupon it is passed on in its negative form by line 174 to a third adder 176.

When the wheel is set down, the inclinometer will measure the final fixture axis inclination angle y' which is presented to the adder 176 from the measurement line 114 by a branch line 177.

As explained in connection with the diagram of FIG. 7, true camber $y_s'$, which is camber measured by the inclinometer I when the wheel is set down and corrected for run-out, is obtained by subtracting the run-out error $\Delta y$ from the final or set down inclination measurement y'. This operation is performed in the third adder 176, and measured camber y' corrected for run-out appears in the output line 178 of that adder as the corrected camber signal $y_s'$. In the preferred binary system, the information in line 178 will be digital, and it is decoded and displayed by a corrected camber display unit 180 which is of known, conventional construction.

Thus, having available a display of true camber (measured camber corrected for run-out), which is the true inclination in the vertical plane of the axis "s" of wheel rotation when the wheel is set down, the mechanic can utilize this display to determine whatever camber corrections are necessary for the wheel in question, i.e., the left front wheel in the example just described. Of course, a similar camber correction circuit is provided for obtaining a corrected camber display for the right front wheel, but since the right wheel circuit is like the circuit for the left wheel, shown in FIG. 8, the right wheel circuit is not illustrated and need not be described.

Toe

The flow diagram of a circuit for measuring toe corrected for run-out appears at the bottom of FIG. 8.

Except for the difference in the sensing elements, the fact that the angle is measured in the horizontal (toe) plane instead of in the vertical plane, and the scale or sensitivity factor, the elements employed in the toe circuit are like those employed in the camber circuit just described. Hence, the toe circuit elements and their various lead lines are given the same numbers as those applied to the corresponding elements in the camber circuit, except that the reference numbers in the toe circuit have appended thereto the small letter "a". Of course, the measured values x, $\Delta$x, x' and $x_s'$, for toe, corresponding to y, $\Delta$y, y' and $y_s'$ for camber, are inclination angles in a horizontal plane, instead of in a vertical plane.

There is one difference between the toe measurement and the camber measurement. This difference is that when the wheel is set down from its raised position, the difference between the initial or starting inclination y measured by the inclinometer in the vertical plane and the set down or final reading y' is due solely to the change in inclination angle caused by the set down. However, in the toe measurement, when the wheel is set down, the action of the suspension may cause a slight change in wheel position in the toe plane. However, this change is immaterial, because the correct value of the run-out error in the toe plane will have been determined and stored with the wheel jacked up, and if toe changes on set down, the run-out error $\Delta$x in toe will be subtracted from the final value x' of toe with the wheel set down, to obtain a value of toe corrected for run-out for display and utilization during subsequent wheel alignment.

As previously mentioned, in the embodiment described herein, toe for a given wheel is measured by determining which light emitting diode in an array 60 of diodes must be energized to energize a sensor in the fixture mounted on the opposite wheel, as explained in the aforesaid pending patent application of Chang, Ser. No. 834,636, filed Sept. 16, 1977. The toe measurement for the left wheel in FIG. 8 is obtained by connecting each diode of the array 60 by individual lines, indicated as a group at 190, to a microprocessing unit 192, the output of which, in line 112a, provides a digital indication of the toe angle being measured at any wheel position.

While the wheel was being turned at least one revolution from any random start position for obtaining the run-out error $\Delta$y in camber, as described in connection with the upper portion of FIG. 8, corresponding latches, comparators and adders in the toe circuit are functioning to obtain the run-out error $\Delta$x in the toe plane and the true toe $x_s'$ after the stop-start switch 82 has been returned to its "stop" position and the wheel has been set down. It is not believed necessary to provide a detailed explanation of the operation of the toe circuit because it parallels that of the camber circuit just described.

Camber Wiring Circuit

Figure 9A:
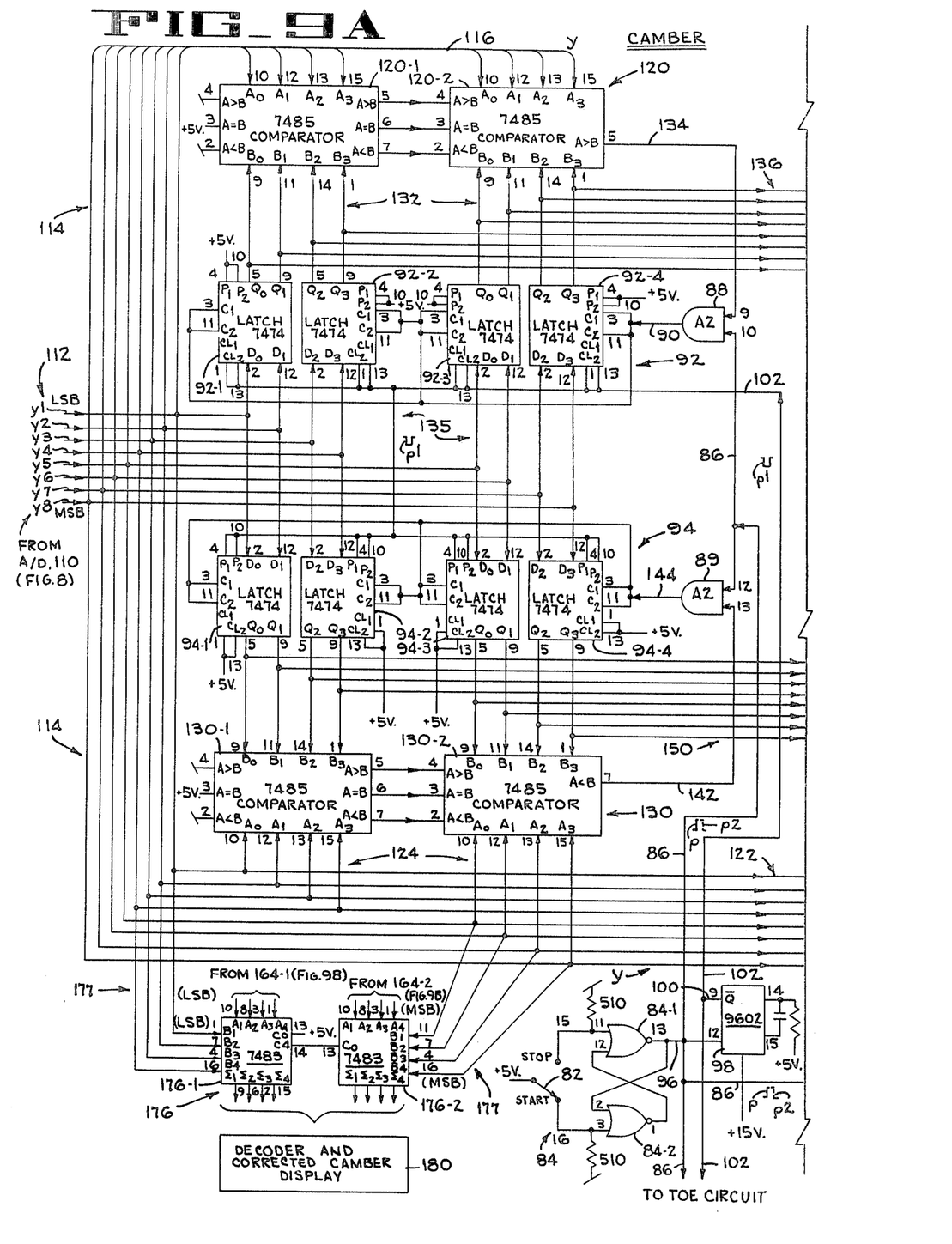
FIGS. 9A and 9B taken together are schematic electrical diagrams of the specific integrated circuitry for measuring the camber run-out corrections for one wheel and obtaining a camber angle corrected for run-out.
Figure 9B:
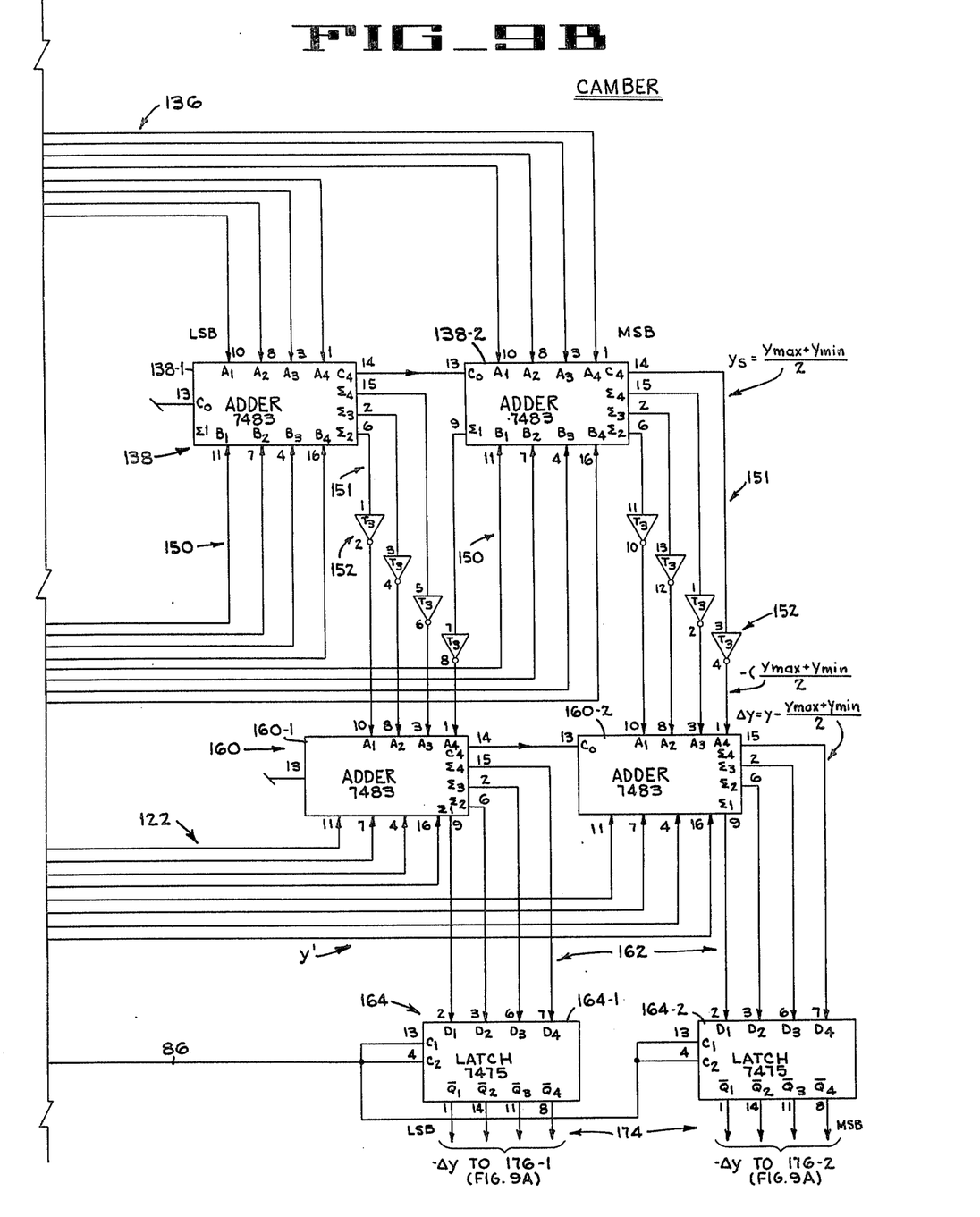

FIGS. 9A and 9B taken together are electrical block diagrams showing some details of the wiring for obtaining the run-out correction in camber and displaying the corrected camber. In the diagram, the digital information is shown entering the circuit at line 112, as described in connection with FIG. 8, and the A/D converter 110 (FIG. 8) provides 8 bits of digital information to the circuit. These bits are indicated as y1–y8, and the incoming information is connected to various terminals of various integrated circuits as indicated in the figures.

In order to handle 8 bits of information with the integrated circuits shown in FIGS. 9A and 9B, commercially available circuits are employed, and sometimes 2 or 4 such circuits are connected together in a conventional manner to handle the 8 bits of digital information input from the sensors from the least significant bit (LSB) to the most significant bit (MSB).

By way of example, the more complex integrated circuits shown in FIGS. 9A and 9B are like those manufactured by Texas instruments Inc. of Dallas, Texas and are described for design engineers in the "DTL Data Book" published by that corporation. The terminal indications for the major integrated circuits indicated as blocks in FIGS. 9A and 9B correspond to those shown in the aforesaid Data Book. Of course, equivalent circuits are available from other manufacturers, as is well known to those skilled in the art. A brief listing of some of the Texas Instrument integrated circuits shown appears below:

Comparators, 120 and 130

Each comparator comprises two SN 7485, 4 bit magnitude comparators, such as 120-1 and 120-2.

Latches 92 and 94

Each latch comprises four SN 7474 dual D-type positive edge triggered flip-flops with pre-set and clear inputs, such as 92-1, 92-2, 92-3 and 92-4.

First Adder 138

The adder 138 is made up of two 4 bit binary full adders, SN 7483A, namely circuits 138-1 and 138-2.

Second Adder 160

The adder 160 is made up of two SN 7483A circuits like those for the first adder 138, namely circuits 160-1 and 160-2.

Latch 164

Latch 164 is made up of two SN 7445, 4 bit bistable latches, namely circuits 164-1 and 164-2.

Third Adder 176

The adder 176 is formed of two SN 7483A circuits like those for the adder 138, namely circuits 176-1 and 176-2.

One-Shot 98

The one-shot circuit 98 is a mono-stable multivibrator which produces a negative going pulse or a "low" of predetermined duration upon receipt of a positive going input voltage. Such circuits are well known to those skilled in the art and no detailed description is required.

Decoder and Display Circuit 180

This is a conventional circuit which converts digital information into analog information and displays it on a meter or in other desired form. Such circuits are well known to those skilled in the art and are commercially available; hence, a specific example thereof is not believed to be required.

By comparing FIGS. 9A and 9B with the camber portion of FIG. 8, the functions and operation of the detailed circuits shown will be readily apparent to those skilled in the art. A few details of the circuit of FIGS. 9A and 9B will be mentioned, but otherwise the information appearing in FIGS. 9A and 9B is believed to be perfectly clear to those skilled in the art. The de-bounce circuit 84 (FIG. 9A) is conventional and includes two cross-connected NOR circuits 84-1 and 84-2. When the switch 82 is on "stop" the output of the de-bounce circuit on line 86 is always a relatively low voltage or a logical "zero", and when the switch is on "start", the output is always a high voltage or a logical "one".

The method employed in the disclosed circuitry for dividing by 2 in the first adder 138 will be briefly mentioned. It will be noted that in the 7483A circuit 138-1, the LSB or sigma 1 output terminal is not connected to the circuit 160-1. As a result, the least significant bit in a quantity developed in the adder circuit 138-1 is not transmitted to the adder circuit 160-1 of the second adder 160, and each bit is shifted by one from the adder 138 to the adder 160. In a binary system, this has the effect of dividing the output from the first adders 138-1, 138-2 by 2.

With regard to the inverter 172, shown between the storage latch 164 and the third adder 176 in FIG. 8, it will be seen that the output terminals of the latch circuits 164-1 and 164-2 are Q outputs, which means that the inversion by inverter 172 of FIG. 8 actually takes place within the circuits of latch 164.

It is not believed that any additional detailed description is necessary to make the circuits of FIGS. 9A and 9B clear enough to one skilled in the art to enable him to practice the invention. As mentioned, the details of the circuitry for measuring run-out corrections in toe and obtaining corrected toe are shown in FIG. 8 and are like those circuits shown in FIGS. 9A and 9B; thus, they need not be described in detail. The lines 86 and 102 from the switch 82 and one-shot circuit 98 are shown in FIG. 94 as having branches leading to the toe circuit as can be readily understood by reference to FIG. 8.

The circuitry of FIGS. 8, 9A and 9B represents a hard wired circuit for determining the run-out corrections. It will be recognized, however, that it may be desirable to use a microprocessor and appropriate software to perform all of the various calculations performed by the circuitry shown in FIG. 8. Thus, lines 112, 112a could present their digital information to a microprocessor which, in accordance with a predetermined program, would provide the appropriate values for the displays 180, 180a. While such a program has not been described herein, it is believed that one skilled in the art could easily derive such a program based on the information provided with respect to the circuitry shown herein. It is intended that a software equipment to the hardward shown in FIG. 8 be within the scope of the present invention.

Thus, it can be seen that by employing the principles of the present invention, the corrections for run-out in both the camber and toe planes and camber and toe corrected for run-out will be displayed. In obtaining the corrected final values of camber and toe, the wheels need only be raised, a switch actuated for each wheel, and the wheel rotated through at least 360° from any random starting position, the switch deactuated, and the wheels lowered back to the ground. Thus, an on-the-fly, or continuous, run-out correction is obtained for ultimate utilization during the subsequent alignment procedures.

Although the best mode contemplated for carrying out the present invention has been herein shown and described, it will be apparent that modification and variation may be made without departing from what is regarded to be the subject matter of the invention as defined in the appended claims.

What is claimed is:

1. Apparatus for correcting for test instrument run-out in a vehicle wheel alignment system of the type wherein a fixture is detachably mounted on a wheel, said fixture including sensor means for detecting the angular inclination of said fixture during rotation of said wheel, and signal means responsive to said sensor means for providing signals proportional to the angular inclination of said fixture in a selected alignment plane; the improvement wherein said sensor means continuously provides fixture inclination signals during rotation of said wheel through at least 360° from any random starting position to any stopped position, means for continuously receiving said continuous inclination signals, maximum and minimum signal comparator devices and maximum and minimum signal storage devices respectively connected to said comparator devices, said means for receiving said inclination signals from said sensor means continuously presenting said inclination signals to said storage devices, said comparator devices having means for selectively providing load signals to their respective storage devices for admitting said inclination signals thereto, said maximum and minimum comparator devices providing said load signals only when said inclination signals are respectively greater than and lesser than the signals received from their associated signal storage devices thereby obtaining and storing the maximum and minimum angular fixture inclination signals in said alignment plane relative to a selected reference plane, first adder means for taking half the sum of said maximum and minimum angular fixture inclination signals to provide a first signal proportional to the actual angular inclination of said wheel in a selected alignment plane, means for coupling said maximum and minimum signals to said first adder means, and means for receiving an intermediate inclination signal from said sensor means when said wheel reaches any random stopped position and for receiving said first signal, said last named means operating to combine said first and intermediate signals and to provide a run-out error signal proportional to fixture run-out at said random stopped position.

2. The apparatus of claim 1, comprising manual switch means movable to a start position for providing load enabling signals to said signal storage devices, and gate means for each storage device for receiving signals from the associated comparator device and said switch means, said gate means providing load signals to their associated storage devices only when they receive signals from both said switch means and the associated comparator device.

3. The apparatus of claim 2, comprising means responsive to the motion of said switch to a start position for initially setting the values stored in said maximum and minimum storage devices respectively to zero and to a value greater than any inclination signal producable by said sensor means.

4. The apparatus of claim 1, wherein said comparator devices, said signal storage devices and said first adder means are made up of digital circuit components.

5. The method of determining test instrument run-out error of vehicle wheels wherein the wheel under test is first raised from the ground and a test instrument is installed thereon, said test instrument comprising a fixture that is detachably mounted on said wheel, said test instrument also comprising a sensor support member that is rotatably mounted on said fixture about an axis that is determined by the mounted position of the fixture, said sensor support member being gravity stabilized as the wheel and fixture are rotated about the wheel axis, sensor means on said stabilized support member for detecting the angular inclination of said fixture axis during said wheel rotation, and signal means responsive to said sensor means for providing signals proportional to the angular inclination of said fixture axis in a selected alignment plane; the improvement comprising the steps of rotating said wheel at least 360° from any random starting position and thereafter stopping wheel rotation at any stopped position, continuously providing fixture axis inclination signals from said signal means during said wheel rotation, obtaining from said inclination signals the maximum and minimum angular fixture axis inclination signals in said selected plane relative to a selected reference plane, taking half the sum of said maximum and minimum angular fixture axis inclination signals to provide a preliminary inclination signal proportional to the actual angular inclination of said wheel axis in said alignment plane, obtaining an intermediate inclination signal from said sensor means and signal means proportional to the angular inclination of said fixture axis in said selected alignment plane at said wheel stopped position, taking the difference between said intermediate inclination signal and said preliminary inclination signal to provide a run-out error signal proportional to that portion of the maximum angular run-out of said fixture axis in said alignment plane that is present at said wheel stopped position with said wheel raised, storing said run-out error signal, lowering said wheel to the ground while the wheel remains at said stopped position, obtaining a final fixture axis inclination signal from said sensor means in said selected alignment plane when the wheel is lowered, and subtracting said run-out error signal from said final inclination signal to provide a corrected alignment signal that represents the true wheel axis inclination in said selected alignment plane, corrected for run-out error.

6. The method of claim 5, comprising the step of preventing the storing of new run-out error signals when the wheel is lowered.

7. The method of claim 5, wherein said selected alignment plane is a vertical plane so that said corrected alignment signal represents wheel camber corrected for run-out.

8. The method of claim 5, wherein said selected alignment plane is a horizontal plane so that said corrected alignment signal represents wheel toe corrected for run-out.

9. The method of claim 5, wherein said selected plane includes both the vertical and the horizontal planes and whereby fixture axis inclination signals are obtained in both planes to provide corrected alignment signals that represent both camber and toe corrected for run-out.

10. The method of determining test instrument run-out error of vehicle wheels wherein the wheel under test is raised from the ground and a test instrument is installed thereon, said test instrument comprising a fixture that is detachably mounted on said wheel, said test instrument also comprising a sensor support member that is rotatably mounted on said fixture about an axis that is determined by the mounted position of the fixture, said sensor support member being gravity stabilized as the wheel and fixture are freely rotated about the wheel axis, sensor means on said stabilized support member for detecting the angular inclination of said fixture axis during said wheel rotation, and signal means responsive to said sensor means for providing signals proportional to the angular inclination of said fixture axis in a selected alignment plane; the improvement comprising the steps of elevating the wheel to free the wheel from the ground, rotating said wheel at least 360° from any random starting position and thereafter stopping wheel rotation at any stopped position, continuously providing fixture axis inclination signals from said signal means during said wheel rotation, obtaining from said continuously received inclination signals the maximum and minimum angular fixture axis inclination signals in said selection plane relative to a selected reference plane, taking half the sum of said maximum and minimum angular fixture axis inclination signals to provide a preliminary inclination signal proportional to the actual angular inclination of said wheel axis in said alignment plane, obtaining an intermediate inclination signal from said sensor means and signal means proportional to the angular inclination of said fixture axis in said selected alignment plane at said wheel stopped position and taking the difference between said intermediate inclination signal and said preliminary inclination signal to provide a run-out error signal that is proportional to that portion of the maximum angular run-out of said fixture axis in said alignment plane that exists at said wheel stopped position.

11. Apparatus for correcting for test instrument run-out in a vehicle wheel alignment system of the type wherein a fixture is detachably mounted on a wheel which has been raised off its underlying support surface, said fixture including sensor means for detecting the angular inclination of said fixture during rotation of said wheel, and signal means responsive to said sensor means for providing signals proportional to the angular inclination of said fixture in a selected alignment plane; the improvement wherein said sensor means continuously provides fixture inclination signals during rotation of said wheel through at least 360° from any random starting position, means for continuously receiving said continuous inclination signals, means for obtaining from said continuous signals the maximum and minimum angular fixture inclination signals in said alignment plane relative to a selected reference plane, first adder means for taking half the sum of said maximum and minimum angular fixture inclination signals to provide a first signal proportional to the actual angular inclination of said wheel in a selected alignment plane when the wheel is raised, and second adder means for taking the difference between an intermediate inclination signal from said sensor means that represents the fixture inclination angle when wheel rotation is stopped and said first inclination signal to produce a run-out error signal that is proportional to that portion of the maximum angular run-out of said fixture that is present at said wheel stopped position.

12. The apparatus of claim 11, comprising means for temporarily storing said run-out error signal, and third adder means for receiving a final fixture inclination signal from said sensor means when the wheel is set down and substracting said run-out error signal from said final inclination signal to provide a signal for wheel alignment purposes that represents the true wheel inclination in said alignment plane, corrected for run-out error when the wheel is set down.

13. The method of correcting for test instrument run-out error of vehicle wheels wherein a test instrument is installed on the wheel under test, said test instrument comprising a fixture that is detachably mounted on said wheel, sensor means on said fixture for detecting the angular inclination of said fixture during rotation of said wheel, signal means responsive to said sensor means for providing signals proportional to the angular inclination of said fixture in a selected alignment plane, and circuit means coupled to receive said signals and including maximum and minimum storage devices; the improvement comprising the steps of rotating said wheel at least 360° from any random starting position and thereafter stopping wheel rotation, continuously providing fixture inclination signals from said signal means during said wheel rotation, continuously comparing, during said wheel rotation, the present inclination signal with the previous inclination signals from said maximum and minimum signal storage devices, admitting the present inclination signal to said maximum signal storage device only when the present inclination signal is greater than that previously stored in said maximum signal storage device, and admitting the present inclination signal to said minimum signal storage device only when the present inclination signal is less than that previously stored in said minimum signal storage, thereby obtaining from said continuously provided inclination signals the maximum and minimum angular fixture inclination signals in said alignment plane relative to a selected reference plane, taking half the sum of said maximum and minimum angular fixture inclination signals to provide an inclination signal proportional to the actual angular inclination of said wheel in said selected alignment plane stopping the wheel at any random rotational position and sensing the stopped wheel fixture inclination, and combining the actual angular inclination signal with the stopped wheel fixture inclination to provide a run-out error signal indicative of the portion of maximum angular fixture run-out existing at the random stopped position.

14. The method of claim 13, comprising the steps of presetting said maximum and minimum signal storage devices to zero and to a value exceeding the greatest expected inclination signal, respectively, before measuring inclination signals during wheel rotation.

* * * * *